United States Patent [19]

Haber et al.

[11] 3,728,452
[45] Apr. 17, 1973

[54] WATER-SOLUBLE COMPOSITION COMPRISING SULFADIMIDINE AND PYRIMETHAMINE

[75] Inventors: Raphael Ralph G. Haber; Eva Schoenberger, both of Givatayim, Israel

[73] Assignee: Abic Ltd., Ramat-Gan, Israel

[22] Filed: Jan. 20, 1971

[21] Appl. No.: 108,231

[52] U.S. Cl. ................................424/229, 424/251
[51] Int. Cl. ...........................................A61k 27/00
[58] Field of Search.....................................424/229

[56] References Cited

UNITED STATES PATENTS 3,551,564  12/1970  Klaui et al. ...........................424/229

OTHER PUBLICATIONS

Hoffman "La Roche" Chem. Abst. Vol. 71 (1969) page 128713t

Primary Examiner—Sam Rosen
Attorney—Steinberg & Blake

[57] ABSTRACT

The present invention relates to a water-soluble composition of N(4,6-dimethyl-2-pyrimidinyl)sulfanilamide (hereinafter called "sulfadimidine") and 2,4-diamino-5-chlorophenyl-6-ethyl-pyrimidine (hereinafter called "pyrimethamine") solubilized with glycols. for oral administration to animals in the form of an aqueous solution thereof, said composition comprising free sulfadimidine and free pyrimethamine both dissolved in a water miscible organic solvent selected from the group consisting of propylene glycol, tetrahydrofurfurylethyleneglycol ether, polyethylene glycol, and methylidene glycerol, and mixtures thereof, the ratio of pyrimethamine:sulfadimidine being between 1:20 to 1:4 by weight.

6 Claims, No Drawings

WATER-SOLUBLE COMPOSITION COMPRISING SULFADIMIDINE AND PYRIMETHAMINE

It is known that both sulfadimidine and pyrimethamine are utilised in the treatment of diseased animals, in particular poultry, suffering from bacterial infections, such as those caused by Salmonella, Pasteurella, Haemophylus Gallinarum, Coli, etc. as well as in the treatment of animals infected by the protozoal disease coccidisos. (The term animals whenever utilised herein comprises birds and human beings).

Moreover, it is known that pyrimethamine and sulfadimidine have a synergistic effect on each other. (See for example Kendall and Joyner, J.Comp.Path.1956, Vol.66, pages 145–150) when utilised in treating animals infected by diseases as indicated above.

Sulfadimidine and pyrimethamine are both practically water insoluble and have thus up to now been administered as part of the feed to the animals. However, when animals are ill, i.e., when the administration of said compounds is required, they usually do not accept the usual amounts of food. On the other hand they generally continue to drink water in this state of health.

The sodium salt of sulfadimidine is water soluble and may be administered to the animals as part of the drinking water. However, said sodium salt has a bitter taste and chicks are reluctant to drink water containing effective quantities of the sodium salt of sulfadimidine as said quantities are quite high.

Pyrimethamine can be converted into an acid addition salt, e.g., the hydrochloride, which is also water soluble.

Thus, both sulfadimidine and pyrimethamine can be converted into water soluble salts. However, it is readily understood that mixing aqueous solutions of the sodium salt of sulfadimidine and of pyrimethamine hydrochloride will cause interactions of the two salts resulting in the precipitation of both sulfadimidine and pyrimethamine and leaving sodium chloride in solution It has thus been desirable to provide a water soluble composition comprising sulfadimidine and pyrimethamine, which composition should be non-toxic and physiologically acceptable, stable and storable for a long time and freely miscible with drinking water in all proportions. The solution obtained when said composition is dissolved in water, should be clear, remain free of any precipitate even if the pH of the water varies within the range allowed for drinking water and be stable for at least 24 hours. Moreover, said composition should be palatable and acceptable to animals in any state of health without having any unpleasant taste or smell.

The present invention thus consists of a water soluble-composition comprising sulfadimidine, pyrimethamine and a solvent selected among a group consisting of suitable glycols and suitable glycol derivatives or a mixture thereof.

Said solvents should be compatible with and dissolve both sulfadimidine and pyrimethamine, be non-toxic and physiologically acceptable, freely miscible with water and should not have any unpleasant taste or smell. Moreover, the solubility power of the solvent should be such that the ratio active compound:solvent should advantageously not exceed 1:30, but preferably not 1:15.

As suitable solvents there may be mentioned:
Propylene glycol
Tetraglycol(Tetrahydrofurfurylethyleneglycol ether)
Polyethylene glycol sold commercially as carbowax (P.E.G.) e.g. (200, 300, 400
1,500, 1,540, 4,000)
Glycerol formal (methylidene glycerol) or 4-hydroxy-methyl-1,3-dioxolane As indicated above said solvents may be utilised as such or as mixtures of some of them. Moreover, the solvents may also comprise a certain amount of water.

The ratio of sulfadimidine and pyrimethamine may be varied to a large extent. The preferred range of the ratio pyrimethamine:sulfadimidine is 1:20 to 1:4 by weight.

By maintaining the above concentrations and ratios it is ascertained that it is sufficient to add about 5–10 ml of the new composition to 1 liter of drinking water in order to obtain effective concentrations of active material.

The desired concentrations of said active compounds are:

a. sulfadimidine: 0.01–0.2 part by weight/100 parts water preferably 0.02–0.06/100 b. pyrimethamine: 0.001–0.05 part by weight/100 parts water preferably 0.002–0.01/100

The compositions according to the present invention may comprise, if desired, additional ingredients, e.g., antioxidants, antiseptics, surface active agents, colouring materials, therapeutics, etc., Said additional substances should be compatible with the other ingredients, be non-toxic and physiologically acceptable, be soluble in water and should not have any adverse effect on the stability of the composition or the solution thereof in water.

The compositions in accordance with the present invention are in general liquid concentrates. However in case that, for example, carbowax, which is a highly viscous waxy solid, is used as solvent the composition solidifies to a solid mass.

The compositions according to the present invention are prepared by methods known per se. The active compounds are dissolved in the solvent preferably with heating and under stirring. If desired the solution obtained is filtered in order to remove any undesired impurities. The liquid concentrate obtained can be dissolved, whenever desired in the drinking water.

In case that carbowax is utilised as solvent, the composition obtained is preferably granulated after cooling to facilitate the dissolution in water.

The present invention will now be illustrated with reference to the following Examples without being limited by them.

EXAMPLE 1

600 g of sulfadimidine and 60 g pyrimethamine were mixed with 9,000 ml of a solution of 90% P.E.G. 300 and 10 percent water.

The mixture was heated to 50°–60°C and stirred for 30'. A clear colourless solution was obtained. After cooling to room temperature the solution was filtered and the volume was adjusted to 10 l with 90% P.E.G. 300. The solution had a concentration of 6; w/v sulfadimidine and 0.6 w/v pyrimethamine and specific gravity: 1.13. It could be mixed with water in any proportion and a stable, clear, neutral solution was obtained. For practical purposes 5 ml of this solution were used for 1 l. of drinking water. A stable solution was obtained and no precipitation was formed after 24 hours.

The solution obtained was administered to a group of 5 chicks infected at the age of 3 weeks with 100,000 of sporulated oocysts of E. Tenella.

At the same time some control chicks were observed. The results are shown in the following Table.

TABLE

| groups | morality | weight 2 weeks | weight 4 weeks | oocycsts No in faeces |
|---|---|---|---|---|
| Non infected control | 0% | 105.4 gr | 253.6 gr. | 0 |
| Infected control without treatment | 10% | 106.5 gr | 225.0 gr | 30 |
| Treated infected group | 0% | 106.5 gr | 264.2 gr | 0 |

As becomes apparent from the above results the solution of the composition according to the present invention was very effective in the treatment of the infected chicks.

EXAMPLE 2

60 g sulfadimidine
5 g pyrimethamine
80 ml P.E.G. 200

20 ml propylene glycol were mixed together and heated with stirring to 70°C. After about 20' a clear solution was obtained, which was cooled to room temperature and filtered. A clear colourless solution was obtained which was filled in bottles.

The solution obtained can be stored and be dissolved in drinking water of different type (pH from 5.5–8.5) in every proportion and a stable clear solution is always obtained.

EXAMPLE 3

50 g sulfadimidine and 10 g pyrimethamine were mixed with 1,000 ml P.E.G. 200. The mixture was heated to 50°C with a high speed mixer for 10 minutes. A clear colourless solution was obtained which was filtered and filled in bottles.

This solution can be mixed with water in any proportion and no precipitation of any compound occurs. The pH of the aqueous solution is about neutral.

EXAMPLE 4

30 g sulfadimidine, 3 g pyrimethamine and 750 g carbowax 4,000 were melted together at 70°–80°C and stirred with a high speed mixer for 30 minutes. A clear melt was obtained which solidified to a solid solution on cooling. The solid mass was comminuted in a suitable granulator to obtain granules.

6 g of this composition were mixed with 1 liter of drinking water and a clear, stable, odorless, colourless and tasteless solution was obtained.

Substantially as described in examples 1–4, compositions having the following formulations were prepared:
a. 400 g sulfadimidine
50 g pyrimethamine
8,000 ml glycerol formal b. 100 g sulfadimidine
50 g pyrimethamine
2,000 ml tetrahydrofurfurylethylenglycol ether

EXAMPLE 5

A composition comprising
300 g sulfadimidine
60 g pyrimethamine
9,000 ml polyethylene glycol 400
1,000 ml water
10 gr ascorbic acid was prepared as follows:

The ascorbic acid was dissolved at first in water and this solution was mixed together with P.E.G. 400 in order to obtain a clear solution. The solution was used to dissolve the sulfadimidine and the pyrimethamine and the final volume was adjusted to 10 l.

EXAMPLE 6

300 g sulfadimidine
75 g pyrimethamine
4,000 ml P.E.G. 200
5,000 ml P.E.G. 400
1,000 ml water 10 g sodium bisulfite were mixed together in the same manner as described in example 5.

The composition was analysed for the content of active ingredients and found

3% w/v sulfadimidine 0.75% w/v pyrimethamine

The composition was stored for 8 months and the active ingredients reanalysed and the values found almost unchanged.

We claim

1. A palatable water-soluble composition for oral administration to animals in the form of an aqueous solution thereof, said composition comprising free sulfadimidine and free pyrimethamine both dissolved in a water miscible organic solvent selected from the group consisting of propylene glycol, tetrahydrofurfurylethyleneglycol ether, polyethylene glycol, and methylidene glycerol, and mixtures thereof, the ratio of pyrimethamine: sulfadimidine being between 1:20 to 1:4 by weight.

2. A palatable aqueous solution for oral administration to animals comprising the composition of claim 1 dissolved in water.

3. An aqueous solution according to claim 2, wherein said solution comprises 0.01–0.2 part by weight sulfadimidine and 0.001–0.05 part by weight pyrimethamine per 100 parts water.

4. An aqueous solution according to claim 4, which comprises 0.02–0.06 parts sulfadimidine and 0.002–0.01 part pyrimethamine per 100 parts water.

5. A method for the treatment of diseased animals amenable to sulfadimidine-pyrimethamine therapy which comprises orally administering to such animals the composition of claim 2.

6. A method according to claim 5, wherein the composition of claim 1 is dissolved in the drinking water of the animals which are then caused to drink the thus formed drinking water.

* * * * *